(12) United States Patent
Ellegood (10) Patent No.: US 7,921,726 B2
(45) Date of Patent: Apr. 12, 2011

(54) FLUID SENSOR WITH MECHANICAL POSITIONAL FEEDBACK

(75) Inventor: Paul L. Ellegood, Winlock, WA (US)

(73) Assignee: Precision Pumping Systems, Inc., Kelso, WA (US)

( * ) Notice: Subject to any disclaimer, the term of this patent is extended or adjusted under 35 U.S.C. 154(b) by 0 days.

(21) Appl. No.: 11/759,881

(22) Filed: Jun. 7, 2007

(65) Prior Publication Data

US 2007/0295104 A1    Dec. 27, 2007

Related U.S. Application Data

(60) Provisional application No. 60/804,548, filed on Jun. 12, 2006.

(51) Int. Cl.
*G01L 7/14* (2006.01)

(52) U.S. Cl. .......................................... 73/740

(58) Field of Classification Search .. 73/861.71–861.75, 73/720, 726; 250/573–576
See application file for complete search history.

(56) References Cited

U.S. PATENT DOCUMENTS

| | | | |
|---|---|---|---|
| 4,191,951 A * | 3/1980 | Fuzzell | 340/610 |
| 5,576,684 A | 11/1996 | Langford | |
| 5,583,476 A | 12/1996 | Langford | |
| 5,663,508 A * | 9/1997 | Sparks | 73/861.71 |
| 5,767,419 A * | 6/1998 | Hutchinson | 73/861.74 |
| 5,789,827 A | 8/1998 | Rowley et al. | |
| 6,032,540 A * | 3/2000 | Hawkins | 73/861.75 |
| 6,236,301 B1 | 5/2001 | Langford et al. | |
| 6,392,527 B1 | 5/2002 | Gilano et al. | |
| 6,497,430 B1 | 12/2002 | Odom et al. | |
| 6,730,927 B1 * | 5/2004 | Smith et al. | 250/573 |
| 7,248,142 B2 | 7/2007 | Beck et al. | |
| 2007/0030111 A1 | 2/2007 | Beck et al. | |

* cited by examiner

*Primary Examiner* — Jewel Thompson
(74) *Attorney, Agent, or Firm* — Marger Johnson & McCollom, P.C.

(57) ABSTRACT

A fluid detection device is herein disclosed as including a sensor mount, a flexible deflection sensor rigidly connected to the sensor mount and a stiffener. The stiffener is arranged together with the flexible deflection sensor such that the flexible deflection sensor is preconfigured to deform in a predetermined manner when the fluid detection device is exposed to a fluid. An amount of the deformation of the flexible deflection sensor determines a property of the fluid.

A pressure sensing apparatus is herein disclosed as including a rigid perimeter, a flexible membrane forming a surface area bounded by the perimeter, and a sensing means in communication with the flexible membrane. The flexible membrane is configured to elastically deform when a pressure force is exerted on the surface area, and the sensing means is configured to measure an amount of deformation of the flexible membrane.

10 Claims, 8 Drawing Sheets

FLUID SENSOR WITH MECHANICAL POSITIONAL FEEDBACK

CROSS REFERENCE TO RELATED APPLICATION

This application claims priority from U.S. Provisional patent application Ser. No. 60/804,548 filed, 12 Jun. 2006, titled Flow Sensor With Mechanical Positional Feedback Device and Method of Sensing Flow Rate Using Same, the disclosure of which is herein incorporated by reference in its entirety.

BACKGROUND

1. Technical Field

This disclosure relates generally to fluid measurement and detection devices, including methods of sensing fluid flow, fluid levels and pressure.

2. Description of the Related Art

Current sensor devices and technology depends on many different methods of acquiring fluid property measurements from various apparatuses that are either problematically invasive and/or expensive. Devices that rely on an invasive approach create a large differential pressure within the fluid stream that negatively impedes fluid flow. Other devices rely on very small, easily plugged orifices or contain multiple parts that rotate or move with respect to each other, such as bearings, that are susceptible to failure due to material on material contact. Such devices are expensive to manufacture, assemble and repair. Friction forces acting on the device parts results in the worn away material being carried downstream, potentially causing extensive damage to other components, systems or machines.

Conventional sensor devices are only able to measure a fluid flow in a single direction, or require at least two sensors to measure opposite fluid flow. Other sensors similarly rely on a multiple sensor approach to measure different fluid properties, such as fluid level.

The present invention addresses these and other problems.

SUMMARY

A fluid detection device is herein disclosed as including a sensor mount, a flexible deflection sensor rigidly connected to the sensor mount and a stiffener. The stiffener is arranged together with the flexible deflection sensor such that the flexible deflection sensor is preconfigured to deform in a predetermined manner when the fluid detection device is exposed to a fluid. An amount of the deformation of the flexible deflection sensor determines a property of the fluid.

A fluid sensing system is herein disclosed as including a sensor port and a sensor having a first end mounted to the sensor port and a second end configured to deflect in a predetermined arc when exposed to a fluid force. An electric signal is propagated through the sensor during operation of the fluid sensing system. The fluid sensing system further includes a stiffening agent located adjacent the sensor which provides a preconfigured resistance to a deflection of the second end of the sensor. A characteristic of the electrical signal that varies with an amount of deflection of the sensor is measured to infer a property of the fluid force.

A pressure sensing apparatus is herein disclosed as including a rigid perimeter, a flexible membrane forming a surface area bounded by the perimeter, and a sensing means in communication with the flexible membrane. The flexible membrane is configured to elastically deform when a pressure force is exerted on the surface area, and the sensing means is configured to measure an amount of deformation of the flexible membrane.

DETAILED DESCRIPTION

The measurement of fluid properties such as fluid flow rate, fluid pressures and fluid levels, has a wide range of uses and application in industry. For example, a municipal water works may want to monitor how much water is being consumed by its customers. A sewage treatment plant may want to monitor how much waste water is being transferred to a holding tank. Some uses include determining a fluid flow or pressure in an oil or natural gas line. Other applications include measuring a fluid level in a pipe, tank, river or even a lake. Measuring fluid properties therefore has the potential to provide many commercial benefits. The following embodiments provide examples of measurement devices and methods of measuring fluid properties for any number of different types of fluids, including liquids and gases.

Figure 1:
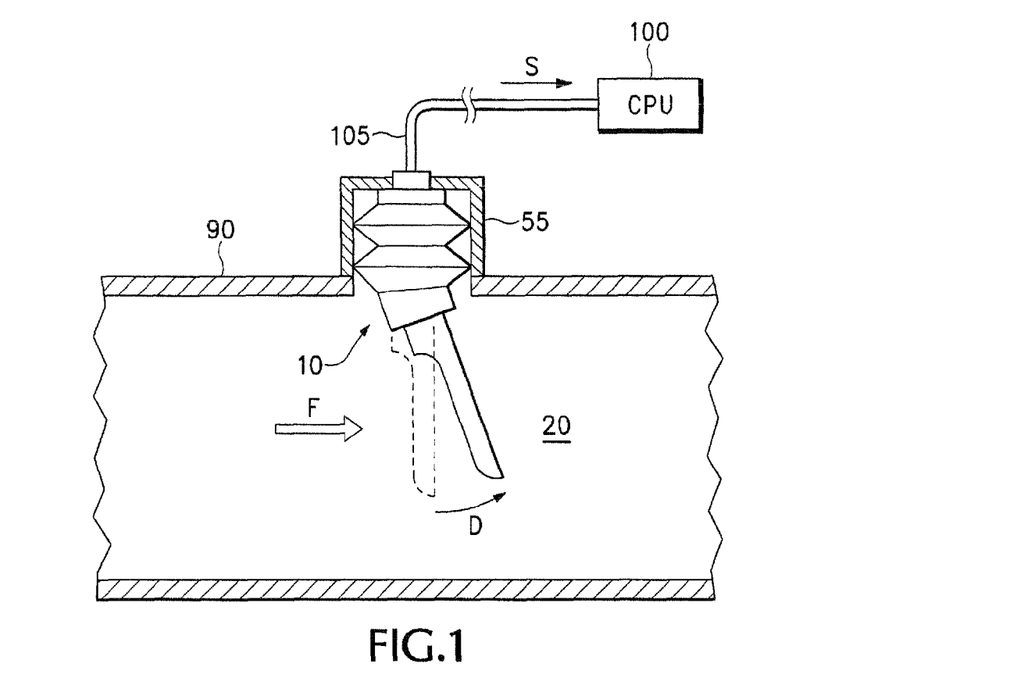
FIG. 1 is a diagram illustrating an example fluid sensing system including a fluid sensor, mounted in a fluid carrier.

FIG. 1 is a diagram illustrating an example fluid sensing system 10 mounted in a fluid carrier 90. The fluid carrier 90 may be a pipe, line, conduit, ditch, canal, or river bed that is capable of transporting a fluid 20. The fluid carrier 90 may be part of an open system, for example where the fluid 20 is transferred through the fluid carrier 90 to an external endpoint, and the fluid 20 is replenished by an external source. In one embodiment, the fluid carrier 90 may be part of a closed system, for example where the fluid 20 is entirely contained or recycled with the fluid carrier 90 and any associated equipment.

The fluid 20 may include water, oil, gasoline, chemical or any other liquid. The fluid 20 may also or alternatively include air, natural gas, exhaust or any other gas. In one embodiment, the fluid 20 includes a physical medium composed of small moving particles moving fluidly through the fluid carrier 90, such as grain, soil, rocks, dust, debris or other particulates.

The fluid 20 is shown moving in a direction of flow, consistent with a fluid force F, through the fluid carrier 90. In one embodiment a source connected at one end of the fluid carrier 90 is providing the fluid 20 to one or more destinations at an opposite end of the fluid carrier 90. The fluid sensing system 10 may undergo a deflection D that corresponds with the direction of flow of the fluid force F. When the fluid sensing system 10 undergoes deflection D, this indicates that the fluid 20 is moving in the direction of flow of the fluid force F.

The fluid sensing system 10 is shown mounted to a sensor port 55. Sensor port 55 may be connected to the fluid carrier 90 through a fitting in a wall, for example, to provide access to the fluid 20. The fluid sensing system 10 may further be connected to a switch or processor 100 via electrical connection 105. The fluid sensing system 10 may therefore be in electrical communication with the processor 100.

Figure 2:
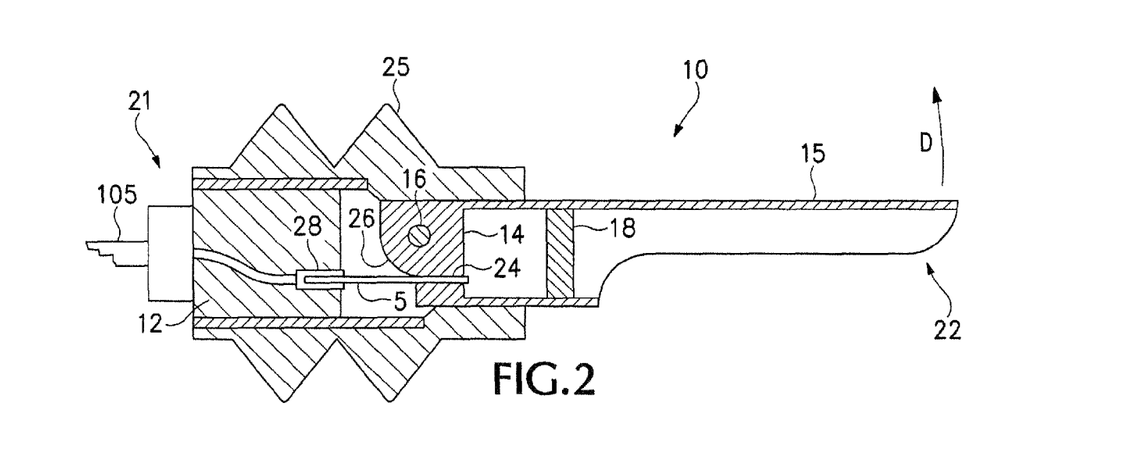
FIG. 2 is a cross sectional view of the example fluid sensor of FIG. 1.

FIG. 2 is a cross sectional view of the example fluid sensing system 10 of FIG. 1. The fluid sensing system 10 is shown as including a sensor 5, a stiffening agent 25, and a sail 15. The fluid sensing system 10 is illustrated as including a mast or first end 21 configured to be mounted to the sensor port 55 of FIG. 1. A first end 28 of the sensor 5 may be connected to the electrical connection 105, also of FIG. 1, in order to transmit the electrical signal S to the processor 100.

The fluid sensing system 10 further includes a second end 22 configured to deflect in a predetermined arc according to deflection D when exposed to the fluid force F. The second end 22 may be configured to direct flow over it in such a fashion as to minimize vortex shedding, provide an additional positive lifting force as well as in-flight stability. By directing fluid flow across a specific path the shape of the second end 22 may maximize Bernoulli's related effects while working to minimize Von Karmen effects as they relate to laminar-turbulent transition. A magnitude of the flow within a fluid carrier having specific pipe dimension is one design criteria for the size and shape of the sail 15. Design considerations may further include fluid velocity and flow pressure. The velocity within a given pipe diameter is a function of the Bernoulli effect and is a conservation of energy calculation.

The stiffening agent 25 is shown located adjacent the fluid sensing system 10. The stiffening agent 25 may encompass the first end 21 of the fluid sensing system 10. The stiffening agent 25 may further provide a preconfigured resistance to the deflection D of the second end 22 of the fluid sensing system 10. Resistance to the deflection D of the second end 22 may also be provided in addition to or in place of the stiffening agent 25 according to a stiffness of the sensor 5, a pivot spring arranged with the pivot 16, or due to the shape and design of the sail 15 or other components of the system 10. In one embodiment, the entire fluid sensing system 10 may be referred to as a sensor.

The sail 15 may include a pivot 16 to enable the sail 15 to undergo deflection D. The sensor 5 may be provided in the fluid sensing system 10 for detecting when or how much the sail 15 is deflected or pivoted about pivot 16. The first end 28 of the sensor 5 may be connected to or engaged with a bushing 12. A second end 24 of the sensor 5 may be connected to or engaged with a sensor carrier assembly 14. Either or both of the bushing 12 and sensor carrier assembly 14 may include multiple pieces that clamp, fasten, engage or otherwise connect to either end 24, 28 of the sensor 5. In one embodiment, the pivot 16 and cam 26 may be provided as integral components in the sensor 5.

In another embodiment, the sensor 5, bushing 12 and sensor carrier assembly 14 may be utilized together to translate a deflection of the sail 15 into detectable linear motion of the sensor. For example, sensor 5 may operate as a conductor and bushing 12 may be configured to utilize an impedance measurement of positional relationship. The positional feedback may be measured with electromagnetic measurement devices or through the operation of magnetorheological hydraulic restriction as a source of positional feedback. The deflection arc D can be translated into linear pull to determine an extremely precise inferential flow measurement.

By allowing the sail 15 to pivot away from the direction of the fluid flow, any incidental impedance to the fluid flow through the fluid carrier 90 is decreased. When a fluid flows over the sail 15, the fluid exerts the fluid force F on the sail 15. The fluid force F causes the sail 15 to deflect about the pivot 16 in the direction of the fluid flow. The stiffening agent 25 provides mechanical feedback to the sail 15, thereby limiting the magnitude of the deflection of the sail 15. The magnitude of the deflection of the sail 15 may correspond to the magnitude of the fluid force F. The sensor 5, which is connected to the sail 15 through a sensor carrier assembly 14, deflects in coordination with the sail 15. Consequently, the stiffening agent 25 allows movement of the sail 15 and the sensor 5 in a predetermined arc depending on the magnitude of the fluid flow.

As the sail 15 undergoes deflection D and pivots about pivot 16, the carrier assembly 14 also pivots about the pivot 16, and causes the second end 24 of the sensor 5 to bend or deflect about the carrier assembly 14. A cam 26 provided on the carrier assembly 14 smoothly engages a bending surface of the sensor 5 as the second end 24 of the sensor 5 is deflected. A barrier plug 18 may be provided internal to the sail 15 in order to form a barrier between the sensor 5 and the fluid 20 of FIG. 1. In some embodiments, the fluid 20 includes a corrosive property that may damage the sensor 5 or internal components of the fluid sensing system 10 if they come into contact with each other. The stiffening agent 25 may provide yet a further barrier against the fluid 20 when fitted into the sensor port 55 of FIG. 1.

During operation of the fluid sensing system 10, an electric signal S may be propagated through the sensor 5. A characteristic of the electrical signal S that varies with an amount of deflection D of the sail, and hence also varies by a proportionate amount of deflection of the sensor 5, may be measured to infer a property of the fluid force F. The characteristic may include an electrical resistance, voltage, current, impedance or wave characteristic of the electrical signal.

The stiffening agent 25 or other design characteristics of the system 10 may be configured to provide a different amount of spring force or resistance to the deflection D of the fluid sensing system 10, and hence also to the sensor 5, for a given fluid force F to compensate for different fluid conditions. For example, the fluid 20 may have varying amounts of liquid viscosity, flow rate, temperature or pressures that could impact the amount of deflection D. Depending on the range of fluid force to be measured, the stiffening agent 25 may be configured to provide suitable measurements depending on the particular application and fluid forces involved. For example, a fluid sensing system 10 provided for a first fluid flow rate which is greater than a second fluid flow rate may include a stiffening agent 25 that provides a greater amount of spring force.

A design of a fluid sensing system 10 may take into consideration the varying mechanical requirements of flow streams with respect to the mechanical bending properties of the stiffening agent 25, the sensor 5 or other components of the system 10. The fluid sensing system 10 may be configured to provide a linear or logarithmic output, even when subjected to fluidic turbulence, buoyancy, acoustic pulses, electrical noise, etc. that may otherwise negatively effect a consistent measurement. The design may account for motion generated from flow pressure on the fluid sensing system 10 as well as twisting and flexing motions resulting from flow turbulence. The magnitude of the output due to turbulence can be equal to or greater than the magnitude of the output that is inferential to flow.

By way of example, the following equations depict how the amount of spring force of the stiffening agent 25 may be calculated, taking into account a surface area of the sail 15 or effective area of the sensor immersed in the fluid, and a velocity of the fluid 20. In this example, the fluid 20 is water flowing through a pipe.

Velocity Head: $h_v = V^2/(2*g)$ (ft)

where:
V=velocity of water through pipe (ft/s)
V=Q*(1 gallons/7.4805 ft$^3$)*(1 min/60 sec)/A (ft/s)
Q=Flow (gpm)
A=Pipe area (ft$^2$)
g=32.174 ft/s$^2$ Pressure (due to velocity Head): $P = .433 * h_v$ (psi)

Force on Sail, from flow: $F_f = P * A_{sail}$ (lbsf)

where: $A_{sail}$=Area of the sail in the water. (in$^2$)

Force on the sail through the angle: $F_t = F_f * \cos(\theta)$ (lbsf)

where: θ=angle of the sail from (0°-45°)

The force on the sail may be estimated as a point load in the middle of the sail. This causes a torque applied to the axis of rotation that will be countered by a stiffener or spring, at a given radius from the axis. The spring will be such that it will deflect the arc length from 0°-45° at the given radius.

Force on the Spring: $F_s = F_t(R_{sail})/(R_s)$ (lbsf)

where:
$R_{sail}$=radius to the midpoint of the sail.
$R_s$=radius to the spring action Deflection: $\delta = R_s * \theta_r$ (in)

where: $\theta_r = \theta*(\pi/180)$ (radians)

The deflection that the spring will see is equal to the length of travel around the axis of rotation, at the radius of the spring action.

Spring Constant: $k = F_s/\delta$ (lbsf/in)

Using these equations, we can find the Velocity of water as a function of the angle, while the flow sensor is in the pipe. This means that several parameters must be set, such as the sail dimensions ($A_{sail}$, $R_{sail}$), the Spring Constant (k) and the radius to the spring action ($R_s$).

$$F_f = P * A_{sail}$$
$$\approx F_f = (.433 * h_v) * A_{sail}$$
$$\approx F_f = \{.433 * [V^2/(2*g)]\} * A_{sail}$$

so:

$$F_t = F_f * \cos(\theta)$$
$$\approx F_t = (\{.433 * [V^2/(2*g)]\} * A_{sail}) * \cos(\theta)$$

so:

$$F_s = F_t(R_{sail})/(R_s)$$
$$\approx F_s = [(\{.433 * [V^2/(2*g)]\} * A_{sail}) * \cos(\theta)] * [(R_{sail})/(R_s)]$$
$$F_s = [(\{.433 * [V^2/(2*g)]\} * A_{sail}) * \cos(\theta)] * [(R_{sail})/(R_s)]$$

Working from the spring mechanics:

$$k = F_s/\delta$$
$$\approx F_s = k * \delta$$
$$\approx F_s = k * (R_s * \theta_r)$$

so:

$$F_s k * \{R_s * [\theta * (\pi/180)]\}$$

Setting the two ($F_s$) equations equal, we can solve for $V^2$ and have an equation that relates the velocity of the water to the angle of the sail.

$$F_s = (k * \{R_s * [\theta * (\pi/180)]\}) = [(\{.433 * [V^2/(2*g)]\} * A_{sail}) * \cos(\theta)] * [(R_{sail})/(R_s)] \quad \text{Equation 1}$$

$$V^2 = (k * \{R_s * [\theta * (\pi/180)]\} * [2 * g * R_s])/[(.433 * A_{sail}) * \cos(\theta) * (R_{sail})]$$

$$V^2 = \frac{[k * \{R_s * [0 * (\pi/180)]\} * (2 * g * R_s)]}{[(.433 * A_{sail}) * \cos(\theta) * (R_{sail})]}$$

Rewritten to:

$$V^2 = \frac{[k * (R_s)^2 * (\theta * \pi/180) * (2 * g)]}{[(.433 * A_{sail}) * \cos(\theta) * (R_{sail})]}$$

This equation can also be solved for (k), as a function of the other parameters:

$$k = \frac{[V^2 * (.433 * A_{sail}) * \cos(\theta) * (R_{sail})]}{[(R_s)^2 * (\theta * \pi/180) * (2 * g)]} \quad \text{Equation 2}$$

Setting the sail dimensions, the spring radius and picking a spring constant, equation 1 is Velocity as a function of angle or: V(θ). This can be graphed and an approximate equation can be determined to be used in the sensor chip. Another scaling factor may be used to associate the angle to the resistance in the sensor, which is specific to each sensor and determined through calibration.

However to determine an appropriate (k) value, equation 2 can be used. As an example, if the design is such that we want the angle θ=37° when V=15 ft/s and the first detection to be V=5 ft/s at some small initial angle, θ=0.1. The calculation of k may be provided as a function of a linear relationship between V and θ. A linear relationship may not be possible, but helps to determine the value of (k). Using these equations a (k) value can be determined, based on the pipe size and sail geometry.

The Angle (θ) may be provided as 0 (0.1)–45 and V may be calculated with equation 1, above. The Flow (gpm) may be based on this calculated V, the deflection may be calculated from the set Angle value (using $\delta = R_s * \theta_r$), and the force on the spring may be calculated using $F_s = k * \delta$. The force associated with the deflection as well as the force associated with a start of the movement of the sail may therefore be calculated. The spring may be pre-tensioned, to provide a spring back action.

Figure 3:
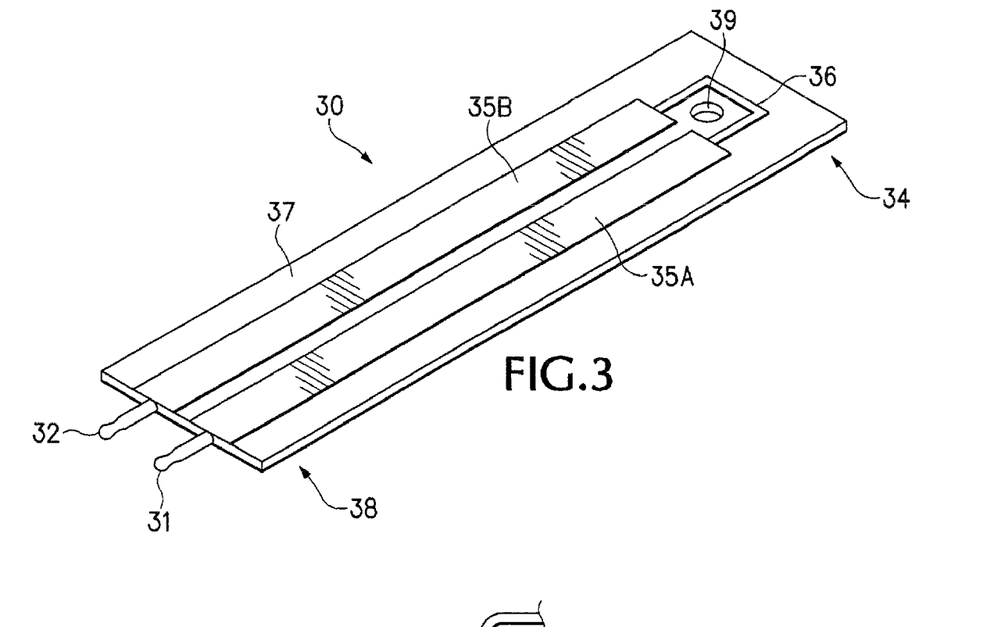
FIG. 3 is an illustration of an example flexible deflection sensor.

FIG. 3 is an illustration of an example flexible deflection sensor 30 such as may be provided for sensor 5 of FIG. 2. Sensor 30 is shown as including two contacts 31, 32 at a first end 38. One or more sensor strips, such as a first sensor strip 35A and a second sensor strip 35B may be attached to, layered with, integrated or otherwise associated with the sensor 30. Sensor strips 35A, 35B may be configured to deform or deflect in unison with the sensor 30. The sensor 30 may include a stiffener 37, which tends to urge the sensor 30 to retain an original pre-deformed position. The contacts 31, 32 may be arranged so as to provide an electrical circuit through the sensor 30. Where more than one sensor strip is provided, a connecting circuit 36 may be provided between sensor strips 35A, 35B to provide a continuous circuit from contact 31 to contact 32.

In one embodiment, an amount of deformation of the sensor 30 results in an electrical signal S (see FIG. 1) that can be correlated with a magnitude of the fluid force F or other property. The sensor strips 35A, 35B may be coated to prevent any adverse interaction between the sensor 30 and the fluid 20. The stiffener 37 may be connected to the sensor strips 35A, 35B in such a way as to provide mechanical feedback to the sensor 30. The electrical contacts 31, 32 may be connected to the sensor strips 35A, 35B to allow a deflection of the sensor 30 to be sensed by external electronic circuitry or a computer, such as processor 100 of FIG. 1. In one embodiment, the sensor 30 includes a mounting hole 39 located at the second end 34.

Turning again to FIG. 1, the sensor 30 may be included in the fluid sensing system 10 and inserted in the fluid carrier 90 in such a way as to allow deflection of the sensor 30 in the direction of a fluid flow. When the fluid 20 flows over the fluid sensing system 10, the sensor 30 deflects due to the fluid force F. The magnitude of the deflection D of the fluid sensing system 10 may be limited by the mechanical feedback provided by the stiffening agent 25 of FIG. 2 or the stiffener 37 of FIG. 3. As the fluid force F increases and decreases, the stiffening agent 25 or the stiffener 37 allows second end 34 of the sensor 30 to move along a predetermined arc. An electrical resistance of the electrical signal S through the circuit of sensor 30 is dependent upon the amount of deflection imparted to the sensor 30 by the fluid force F.

The fluid sensing system 10 and sensor 30 are typically calibrated prior to use. That is, the particular amount of fluid force F required to achieve a particular resistance value or other electrical characteristic of the sensor 30 is known beforehand. Therefore, after the sensor 30 is installed in the fluid sensing system 10, the magnitude of the fluid force F may be determined by sensing the electrical characteristic through the deformed sensor 30. Consequently, the fluid sensing system 10 may be used to measure the magnitude of the fluid flow by sensing the electrical characteristic through the deformed sensor that is mechanically stiffened by the stiffening agent 25 of FIG. 2 or the stiffener 37 of FIG. 3.

Figure 4:
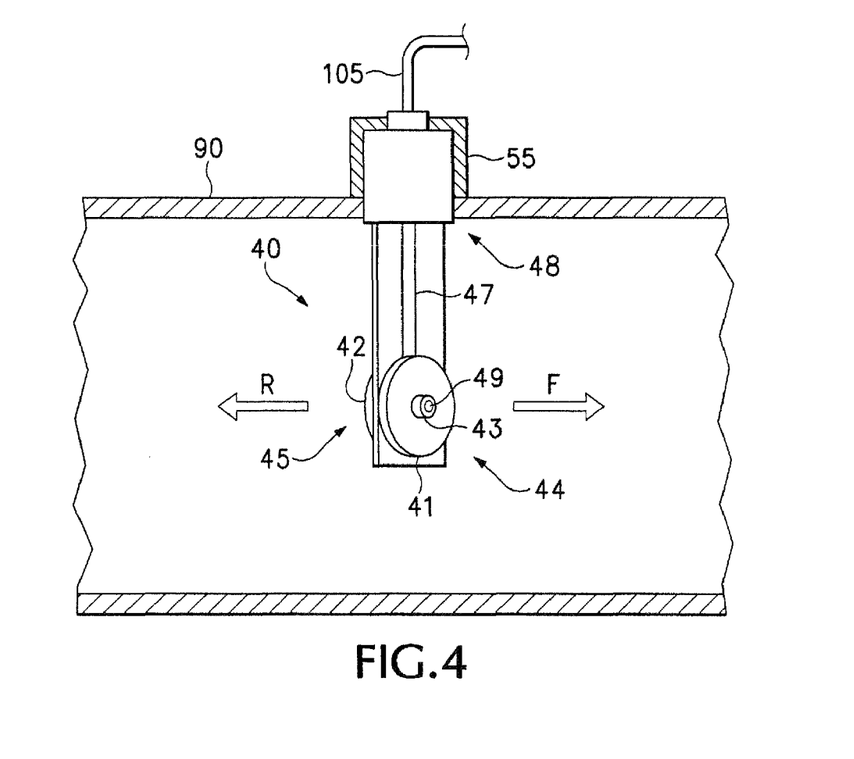
FIG. 4 is diagram illustrating an embodiment of a bi-directional deflection sensor mounted in a fluid carrier.

FIG. 4 is diagram illustrating an embodiment of a bi-directional deflection sensor 40 mounted in a fluid carrier 90. In one embodiment the bi-direction deflection sensor incorporates the sensor 30 of FIG. 3 including the two sensor strips 35A, 35B. For example, sensor strip 35A may be used to detect or measure a fluid flow in a first direction F, whereas sensor strip 35B may be used to detect or measure a fluid flow in a second direction R. By including a first and second sensor strip 35A, 35B, the sensor may be configured to distinguish a fluid flow in a first direction F from a fluid flow in a second direction R opposite the first direction. The sensor 40 may further be connected to a processor 100 via electrical connection 105.

Sensor 40 of FIG. 4 is shown connected to a sensor mount or sensor port 55 by a first end 48. Sensor 40 includes a stiffener 45 located adjacent a second end 44 of the sensor 40. The stiffener 45 may include a male counterweight 42 and female counterweight 41 that interconnect through pin 43. In one embodiment, pin 43 extends through a hole in the sensor 40, such as mounting hole 39 of FIG. 3. In one embodiment, the counterweight pin 43 includes an orifice 49 extending through the stiffener 45 to reduce an amount of fluid turbulence that may build up against a surface of the stiffener 45 or the sensor 40.

When fluid flows over the stiffener 45, some of the fluid is forced through the orifice 49 in the stiffener 45 as the stiffener 45 is deflected by the flow force of the fluid. The male counterweight 42 and female counterweight 41 may dampen the deflection of the stiffener 45 in order to make the stiffener deflection less dependent on minor flow variations, for example, variations due to turbulence in the fluid flow. As the stiffener 45 is deflected, the sensor 40 is also deflected. The sensor 40 may therefore deflect in a predetermined arc correlated to the magnitude of the fluid flow. Consequently, the fluid flow sensed by the sensor 40 does not depend on minor flow variations and may instead be correlated to the actual magnitude of fluid flowing past the stiffener 45.

In one embodiment, the sensor 40 is located in a horizontally oriented fluid carrier 90. The stiffener 45 urges the sensor 40 to a vertical orientation in reduced fluid force conditions, as a result of a gravity force acting on the counterweight 41, 42. Where the sensor 40 requires additional rigidity or spring force, such as where the sensor 40 is mounted in a vertically oriented fluid carrier, a spring 47 may be provided. Additionally, or alternatively, the sensor 40 may include an inherent stiffener such as stiffener 37 of FIG. 3.

Figure 5:
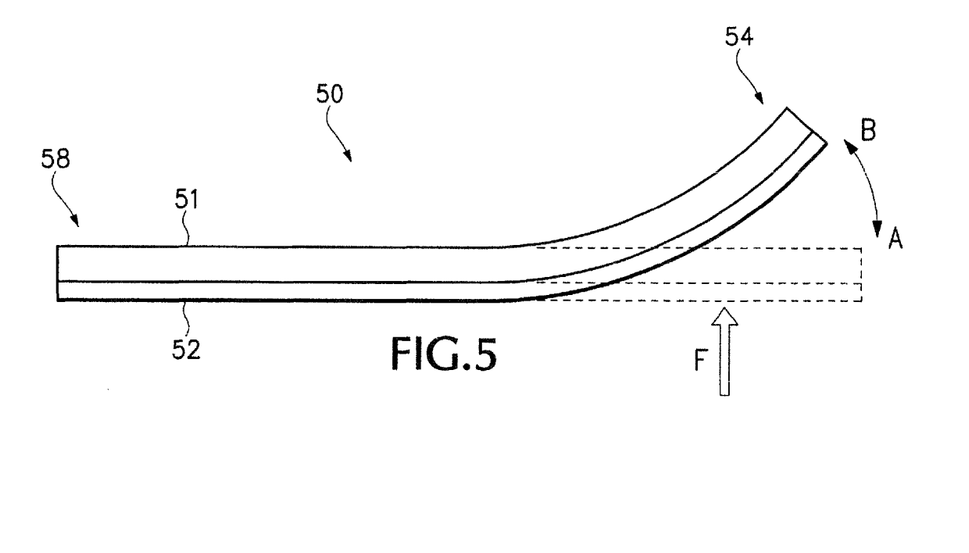
FIG. 5 is a simplified illustration of an example deflection sensor including a stiffening agent.

FIG. 5 is a simplified illustration, or functional block diagram, of an example fluid sensor 50 including a stiffening agent 51. A fluid force F acts against a surface of the fluid sensor 50 causing the fluid sensor 50 to deflect. As the fluid force F increases and decreases, the stiffening agent 51 allows second end 54 of the fluid sensor 50 to move along a predetermined arc AB. In one embodiment, the fluid sensor 50 is designed to deflect across a smooth arc, rather than as a linear whole, so as to provide a repeatable and scalable response. A first end 58 of the fluid sensor 50 may be held rigid while the fluid sensor 50 deflects. A sensor strip 52 may be provided similar to sensor strips 35A, 35B of FIG. 3.

When a fluid flows over the fluid sensor 50, the fluid sensor 50 deflects due to the fluid force F exerted by the fluid. The magnitude of the deflection of the fluid sensor 50 may be limited by the mechanical feedback provided by the stiffening agent 51. The stiffening agent 51 limits movement of the second end 54 to the predetermined arc AB, depending on the magnitude of the fluid force F. The magnitude of the fluid force F may be determined by sensing the electrical resistance of the fluid sensor 50, which is a function of the amount of deflection in the fluid sensor 50.

In one embodiment, the electrical resistance of the fluid sensor 50 is sensed in order to determine the amount of deflection in the fluid sensor 50. However, it is contemplated that other flexible deflection sensors may output other variables as a function of deflection. For example, other flexible deflection sensors may output a voltage or a current that is a function of the amount of deflection in the sensor 50. Output signal characteristics, such as voltage, current, or phase difference relative to an input signal, may be sensed. Therefore, embodiments of the invention are not strictly limited to flexible deflection sensors having resistances that vary as a function of the amount of deflection in the sensor 50. In one embodiment, the stiffening agent 51 is a characteristic of the fluid sensor 50 itself, rather than a separate or combined element. The fluid sensor 50 may provide its own mechanical feedback.

Sensor 50 may be utilized to measure different events on the basis of a direct natural physical reaction to applied forces. According to the type of fluid or other media dependent preferred feedback methodology or technology, the sensor 50 may be configured with designed materials, thickness, geometries or other properties to react in a predetermined arc of motion to the application of force. The sensor 50 or other mechanical device that translates the force to this arc can also be the same means for converting the deflection to a linear reactive force, thereby allowing for inferential measurement of any kind.

Figure 6:
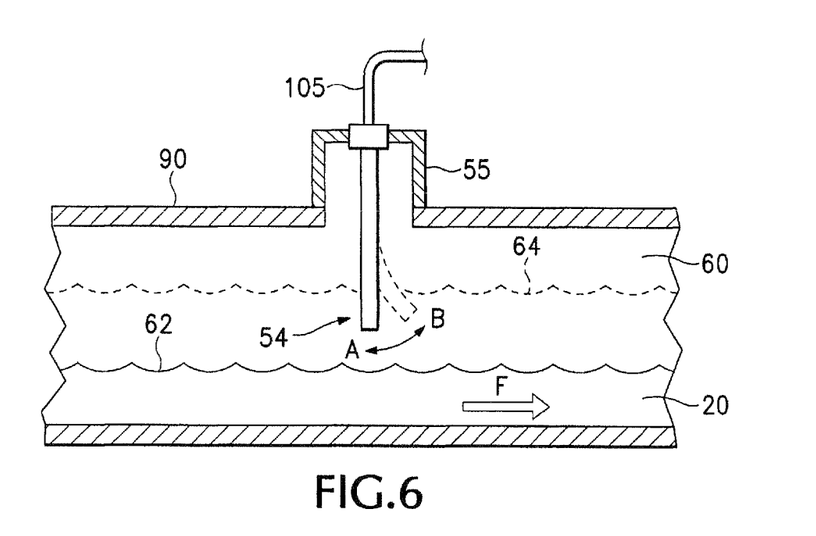
FIG. 6 is a diagram of an example fluid sensor mounted in a fluid carrier that is partially full of fluid.

FIG. 6 is a diagram of an example fluid sensor, such as fluid sensor 50 of FIG. 5, mounted in a fluid carrier 90 that is partially full of fluid 20. Other sensors described in other figures, may similarly be understood to operate similarly as fluid sensor 50. For example, fluid sensor 50 may alternatively be understood as including any of the stiffeners 25, 37, 45, 47, 37 or 51 of FIGS. 2-5. The fluid carrier 90 may be partially full of a second fluid 60, such as air or vapor, which tends to form a second substrate in the fluid carrier 90. The fluid sensor 50 may be rigidly connected to a sensor mount, such as sensor port 55.

The sensor 50 may be preconfigured to deform or deflect in a predetermined manner or predetermined arc when the sensor is exposed to a fluid such as fluid 20. An amount of deformation of the sensor 50 may be used to determine a property of the fluid, such as a flow rate, or a flow level.

In one embodiment, the sensor 50 deflects if a fluid level is above a threshold level, illustrated as fluid level 64, and does not deflect if the fluid level is below the threshold level, illustrated as fluid level 62. The fluid level 62, 64 may be understood as being an approximate interface between fluid 20 and the second fluid 60. The sensor 50 may operate as a switch to detect a fluid flow associated with the fluid level 64 that is greater than the threshold level, illustrated by the second end 54 of the sensor deflecting along the arc AB. Where the fluid 20 is flowing below the threshold level, as indicated by fluid level 62, the fluid force F does not cause the sensor 50 to deflect. In this case, the second end 54 of the sensor 50 is not immersed in the fluid 20. In one embodiment, fluid 60 does not provide sufficient fluid force to cause the sensor 50 to deflect.

Figure 7:
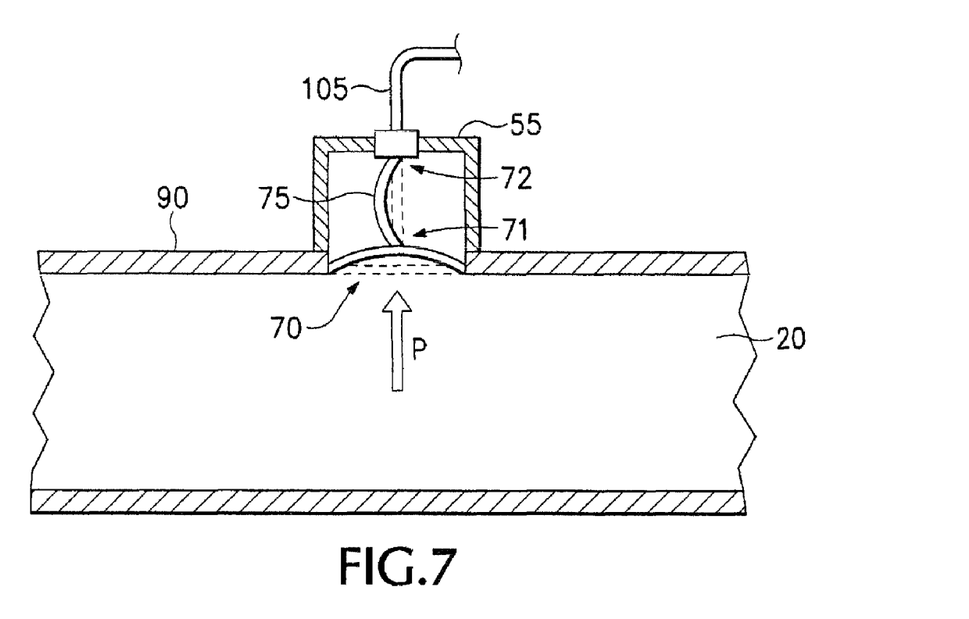
FIG. 7 is a diagram of an example pressure sensor mounted in a fluid carrier.

FIG. 7 is a diagram of an example pressure sensor 70 mounted in a fluid carrier 90. The sensor 70 is illustrated as undergoing a fluid pressure P acting in a general perpendicular direction to the sensor 70. The sensor 70 is shown in a deformed state, with a portion of the sensor 70 being deformed into a recess such as sensor port 55. An amount of the deformation of the sensor 70 may be measured and transmitted via the electrical connection 105 to a processor, such as processor 100 of FIG. 1.

In one embodiment, a flexible sensor 75 is configured to deform in unison with the sensor 70, where the flexible sensor 75 is constrained between a wall of the sensor port 55 and the flexible sensor 75. The flexible sensor 75 may be understood as operating similarly as the previous sensors described in FIGS. 1-6. Flexible sensor 75 is shown in a deformed state. An amount of deformation of either the sensor 70 or the flexible sensor 75 may be used to determine a magnitude of the fluid pressure P acting against the sensor 70. Either or both of the sensor 70 and the flexible sensor 70 may act as a stiffener or stiffening agent. Similarly, either or both of the sensor 70 and the flexible sensor 70 may act as a measuring device to measure an amount of deformation.

Figure 8:
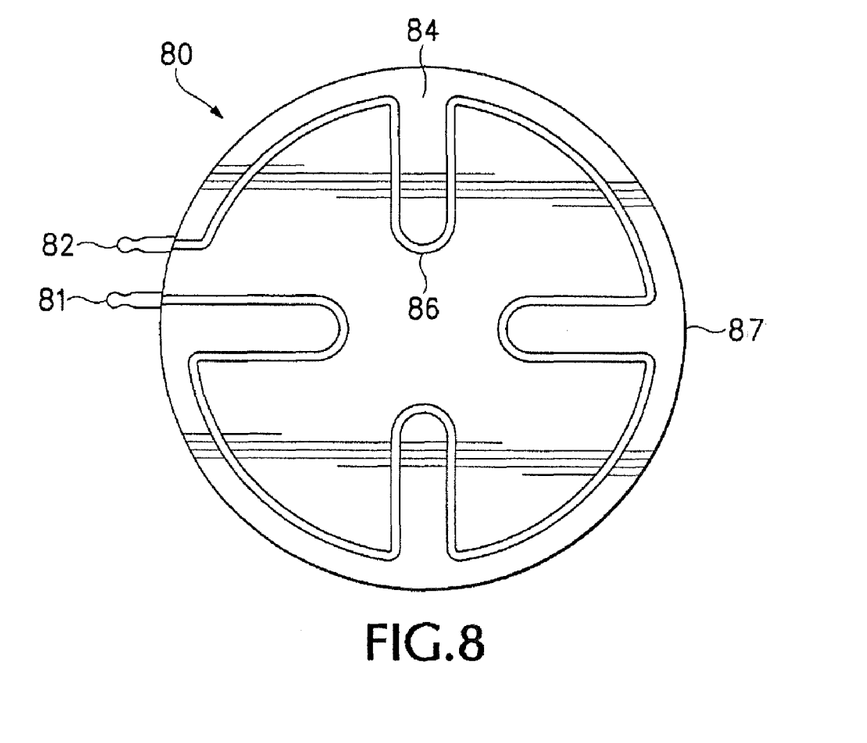
FIG. 8 is an illustration of an example pressure sensor including a flexible membrane.

FIG. 8 is an illustration of an example pressure sensor 80 including a flexible membrane 84. The flexible membrane 84 is shown as forming a surface area bounded by the perimeter 87 of the sensor 80. The perimeter 87 may be understood as forming a substantially rigid outer structure suitable for mounting to a fluid carrier, vessel or container. A flexible sensor circuit 86 is provided in communication with the flexible membrane 84. The flexible membrane 84 may operate as a type of piston.

The sensor circuit 86 may be understood as providing similar functionality as the sensor strips 35A, 35B of FIG. 3, where an electrical circuit is provided through contacts 81, 82 similar to contacts 31, 32 also of FIG. 3. The flexible sensor circuit 86 may overlay or adhere to the flexible membrane 84 to form a circuit for carrying an electrical signal.

The flexible membrane 84 is configured to elastically deform when a force, such as pressure force P of FIG. 7, is exerted on the surface area. The sensor circuit 86 is configured to measure an amount of deformation of the flexible membrane 84. In one embodiment, the pressure sensor 80 may be utilized to perform the same or similar functions as described for sensor 70 of FIG. 7. A deformation of the flexible membrane 84 causes a characteristic of the electrical signal to vary according to the amount of deformation. The characteristic of the electric signal correlates to a magnitude of the pressure force P. The characteristic may include an electrical resistance, voltage, current or wave characteristic of the electrical signal.

In one embodiment, the flexible sensor 75 of FIG. 7 includes a first end 71 connected to an approximate center of the flexible membrane 84. The deformation of the flexible membrane 84 causes the first end 71 of the flexible sensor 75 to move towards a second end 72 of the flexible sensor 75 to vary a characteristic of an electrical signal that is being transmitted through the flexible sensor 75 in order to determine a magnitude of the pressure force P.

Figure 9:
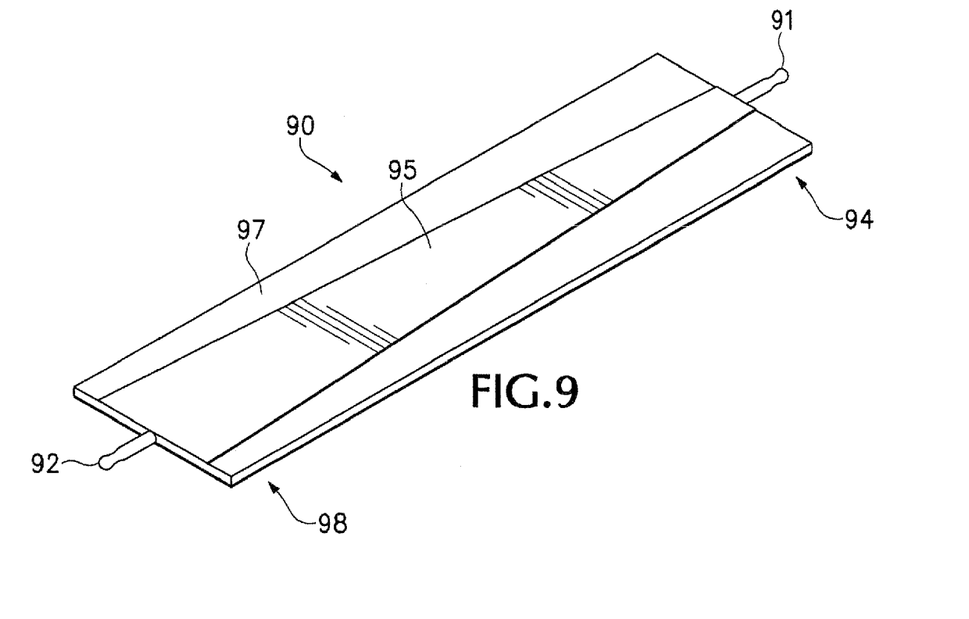
FIG. 9 is an illustration of another embodiment of a fluid sensor.

FIG. 9 is an illustration of another embodiment of a flexible fluid sensor 90. Fluid sensor 90 includes a sensor strip 95 having a wider or thicker section at a first end 98 of the sensor 90, and a narrower or thinner section at a second end 94 of the fluid sensor 90. A stiffener 97 may be provided to control an amount of deformation of the sensor 90. The sensor 90 is shown as including contacts 91, 92 located at either end 94, 98 of the sensor 90. An electrical signal may be transmitted through the sensor 90 via the sensor strip 95 and contacts 91, 92. In one embodiment, the fluid sensor 90 includes multiple independent layers that react with differentiated arc.

The sensor strip 95 may operate to provide similar functionality as sensor strips 35A, 35B of FIG. 3. By providing different width sections along a length of the sensor 90, a characteristic of the electrical signal that is transmitted through the sensor 90 may be made to vary depending on a longitudinal location of the sensor 90 that is deformed. For example, a deformation of the sensor near the first end 98 may cause the characteristic to vary more than a deformation of the sensor 90 near the second end 94. The characteristic may include an electrical resistance, voltage, current or wave characteristic of the electrical signal. In one embodiment, a change in magnitude of the electrical characteristic varies according to a longitudinal position of the sensor 90 where the deformation occurs.

Figure 10:
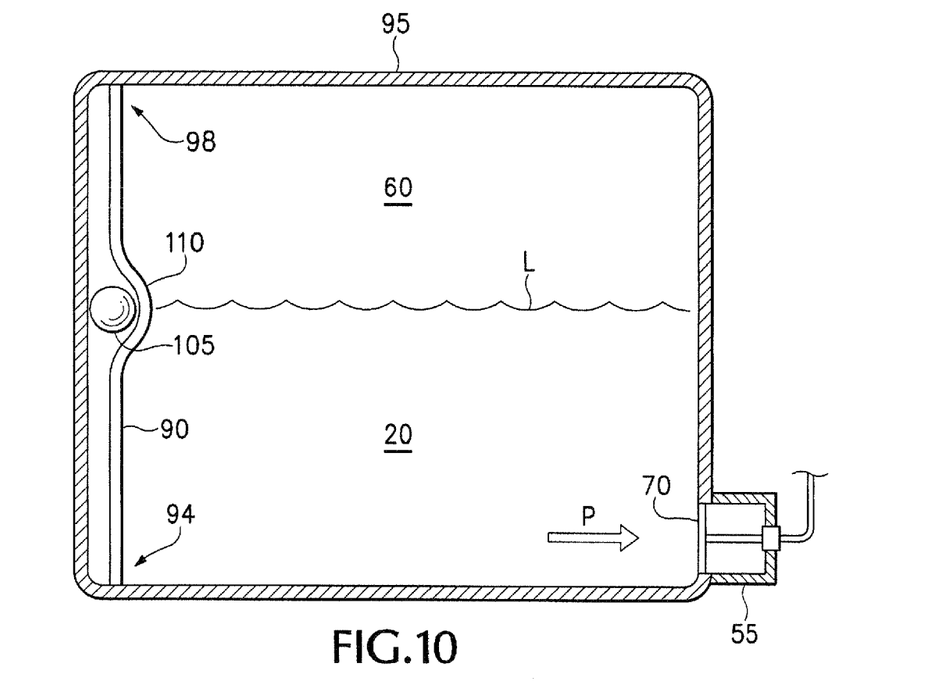
FIG. 10 is a diagram of the fluid sensor of FIG. 9 mounted in a fluid container.

FIG. 10 is a diagram of the fluid sensor 90 of FIG. 9 mounted in a fluid container 95. The first end 98 of the sensor 90 is shown as being positioned near a top of the container, whereas the second end 94 of the sensor 90 is shown as being positioned near a bottom of the container 95. In one embodiment, the sensor 90 is configured to measure a fluid level L of the fluid 20 in the container 95. Fluid 60 may be a gas, vapor or air that fills the rest of the container 95 not occupied by the fluid 20.

The fluid sensor 90 is configured to result in a larger electric signal being transmitted through the sensor strip 95 when a deformation 10 occurs at one end of the flexible deflection sensor, such as the first end 98, as compared with an electrical signal resulting from a deformation at a second end, such as second end 94. A float 105 is shown as being constrained between a wall of the container 95 and the fluid sensor 90. As the fluid level L rises or lowers, the float 105 also rises or lowers, causing the longitudinal position of the deformation 110 to vary accordingly. By measuring the magnitude of the electrical characteristic of the signal transmitted through the fluid sensor 90, a fluid level may be correlated. In one embodiment, a pressure sensor 70 is provided at or near the bottom of the container 95 to measure a pressure P of the fluid 20. A recess or sensor port 55 may be provided in which to mount the pressure sensor 70.

Figure 11:
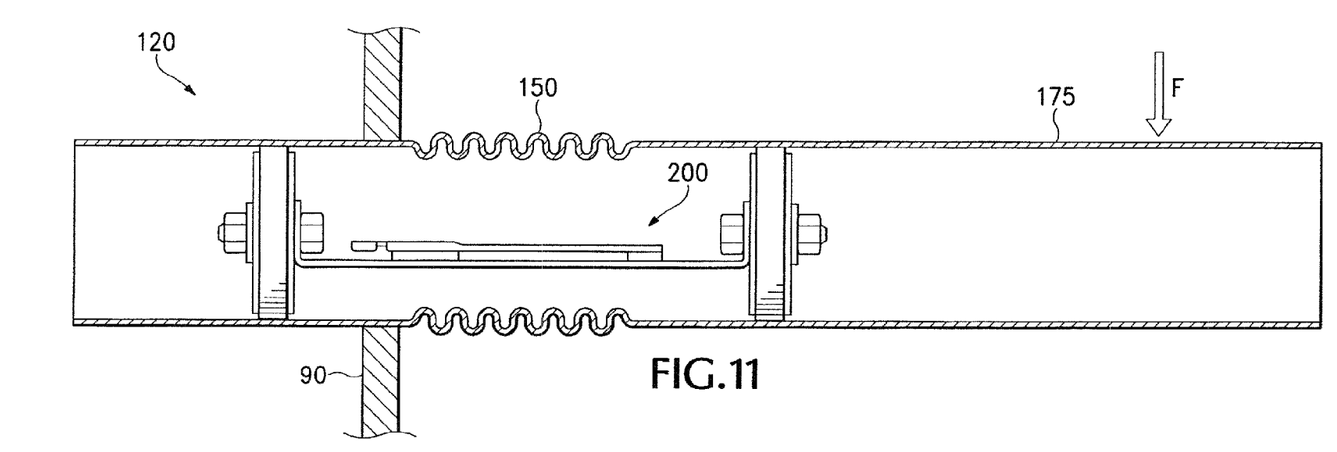
FIG. 11 is a cross sectional view of a further example flexible deflection sensor.

FIG. 11 is a cross sectional view of a further example flexible deflection sensor 120 partially inserted into a fluid carrier 90. The flexible sensor 120 includes a flexible end 175 configured to deflect in a predetermined arc when exposed to the fluid force F. The flexible end 175 provides an effective surface area that operates similarly to the sail 15 of FIG. 2. A flexible joint 150 is provided near a mounting location to the fluid carrier 90. The flexible joint 150 allows the flexible sensor 120 to flex, or deflect, and also may provide a preconfigured resistance to the deflection of the flexible end 175. In one embodiment, the flexible joint 150 provides a spring force that causes the sensor to return to an original straight condition when the fluid force F is sufficiently small.

In one embodiment, the flexible sensor 120 is provided with a sensor and spring arrangement 200 to detect when or how much the flexible end 175 is deflected or pivoted about pivot, such as provided by the flexible joint 150. The sensor and spring arrangement 200 may provide mechanical feedback to the flexible sensor 200, thereby limiting the magnitude of the deflection of the flexible end 175. The magnitude of the deflection of the flexible end 175 may correspond to the magnitude of the fluid force F. The sensor and spring arrangement 200 which is connected to the flexible sensor 120, deflects in unison with the flexible end 175.

Figure 12:
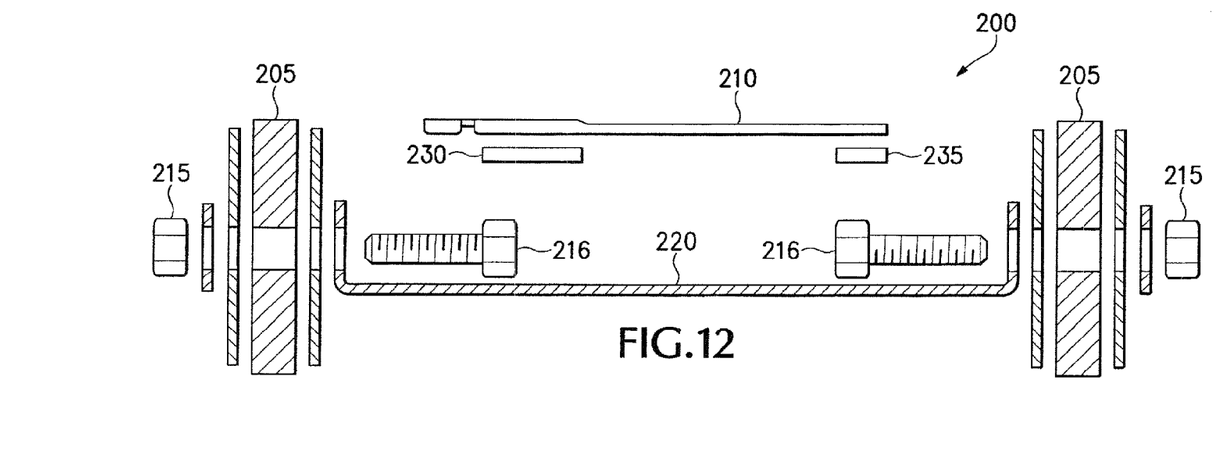
FIG. 12 is an exploded view of an example sensor and spring arrangement, as illustrated in FIG. 11.

FIG. 12 is an exploded view of an example sensor and spring arrangement 200, as illustrated in FIG. 11. The sensor and spring arrangement 200 may be mounted to the flexible sensor 120 by washers 205. The washers 205 may be made of rubber or some other material which forms a seal with an interior of the flexible sensor 120 and thereby forms a barrier between the fluid and a sensor 210. A spring 220 is shown as extending between and attached to the washers 205, by nuts 215 and screws 216. The sensor 210 may be mounted directly to the spring 220, for example, by mounting blocks 230, 235 positioned at either end of the sensor 210. The mounting blocks 230, 235 may be self adhesive, adhering to both the spring 220 and the sensor 220.

Referring again to FIG. 11, the force F acting against the flexible end 175 of the flexible sensor 120, results in a bending or deflection of the spring and sensor arrangement 200. One of the washers 205 lies in either end of the flexible sensor 120. The spring 220 may provide a spring force or resistance to the deflection of spring and sensor arrangement 200 as well as the flexible sensor 120. The spring 220 can provide mechanical feedback to the sensor 210, and control an amount or rate of deflection of the sensor 210 when the fluid force F is being applied to the flexible sensor 120.

Figure 13:
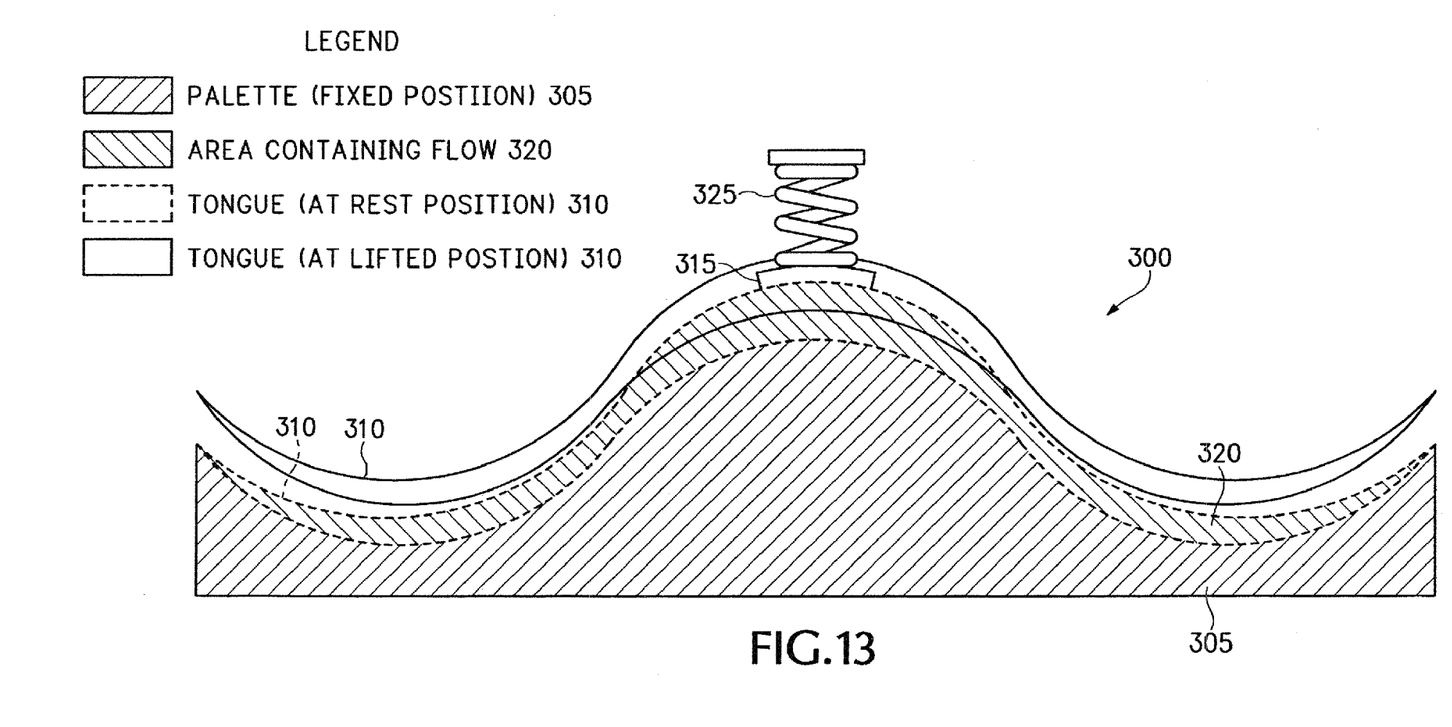
FIG. 13 is a cross-sectional diagram illustrating an example flow meter.

FIG. 13 is a cross-sectional diagram illustrating an example flow meter 300 taken perpendicular to the direction of fluid flow. A palette 305 of the flow meter 300 remains in a fixed position, while a tongue 310 has a variable position depending on the amount of fluid flow through the flow meter 300. The flow meter 300 illustrated in FIG. 13 illustrates the tongue 310 in a lifted position when there is flow present, whereas dashed lines indicate a position of the tongue 300 in a rest (no flow) position. When the tongue 310 is in the lifted position, a flow region 320 is provided between the tongue 310 and the palette 305.

The tongue 310 fits over the palette 305 such that in a zero pressure differential condition the tongue 310 fits firmly over the contours of the palette 305. Unlike a naturally occurring riverbed, the tongue 310 allows Boyle's Law to be implemented because it contains the pressure from the flow and also transmits the force generated by the flow to the presented surface area of the tongue 310. The tongue 310 and the palette 3055 may have a contoured or wavy shape.

The palette 305 may include a groove running its length along with additional parallel, contoured, or stepped surfaces on either side of the main channel that serve as the "banks." The surface of the palette 3055 may be smooth to help facilitate laminar flow through the orifice. This aspect of embodiments of the invention allows for a wide range of directed flow across a surface that allows for increased volume through "flow-plane" expansion.

Figure 14:
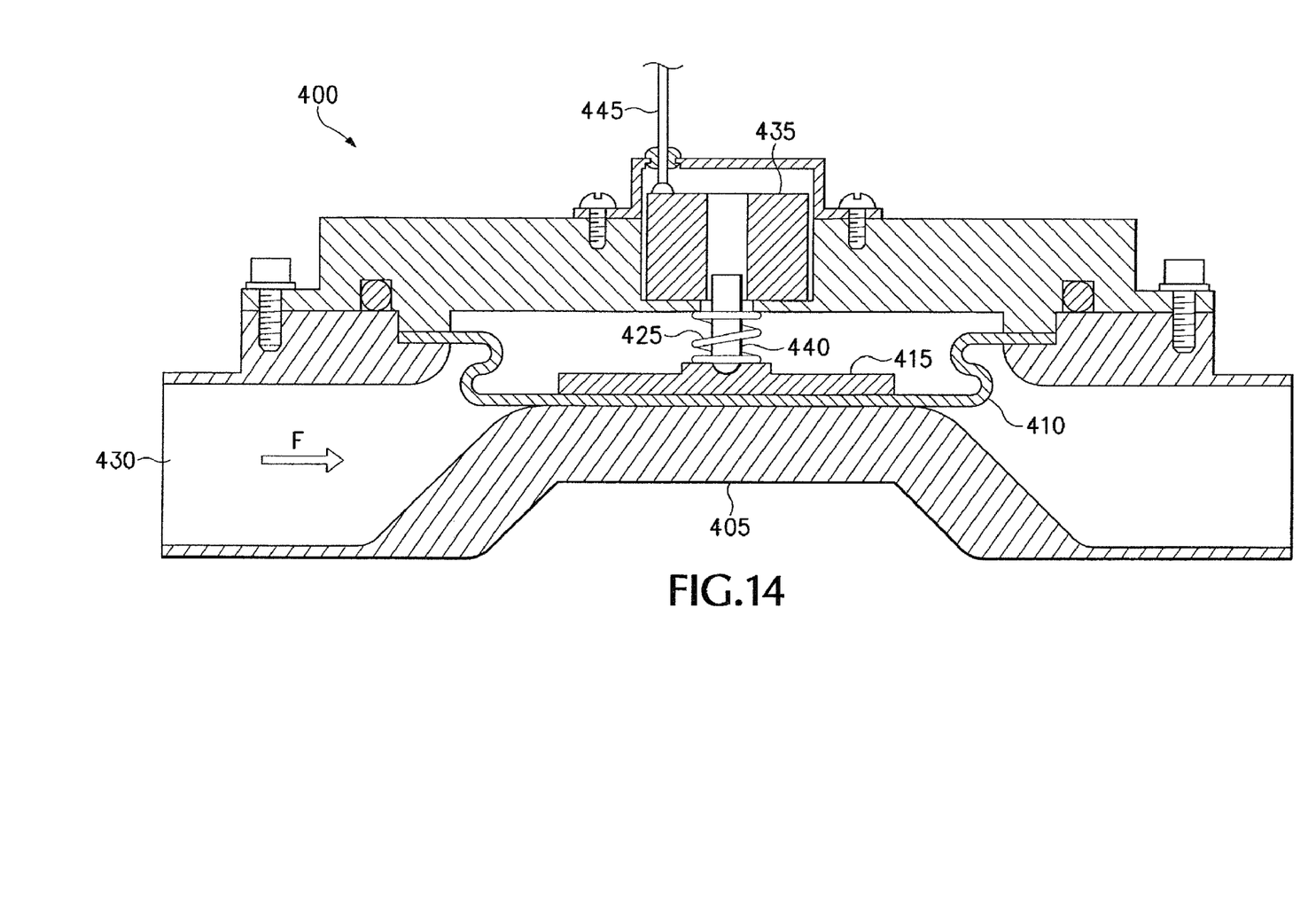
FIG. 14 is a cross-sectional diagram illustrating another example flow meter.

FIG. 14 is a cross-sectional diagram illustrating another example flow meter 400 taken parallel to the direction of fluid flow. The flow meter 400 is shown as including a tongue 410 and the palette 405 that are substantially flat. Other shapes for the tongue 410 and the palette 405 may be used for other embodiments of the invention.

A shoe plate 415 can be held against the tongue 410 by a relatively light bias spring 425. The shoe plate 415 follows the up and down movement of the tongue as the amount of flow through the orifice varies. The flow meter of FIG. 3 may similarly include a shoe plate 315 and spring 325.

As fluid moves into the inlet chamber 430 pressure develops because the tongue 410 is seated against the palette 405 of the variable cavity orifice (VCO), preventing flow. As the pressure in the inlet chamber increases, the tongue 410 begins to lift due to the force applied to its inlet area. The inlet area of the VCO provides enough separation between the palette 405 and tongue 410 to allow for pressure to act on the exposed surface area of the tongue 410, creating additional lifting force.

This lift separates the tongue 410 from the palette 405, creating an orifice where the structural stiffness of the tongue 410 acts as a force counter to the amount of force applied by the combination of velocity head of the fluid moving through the flow meter and the differential pressure across the meter. As flow increases through the flow meter 400, so does the back pressure and the velocity head that in turn create a larger force on the area of the tongue 410 causing greater lift as the tongue 410 again seeks a force balance. This inherent balance is derived from the shape of the tongue 410.

In the example flow meter 400 shown in FIG. 14, several magneto-resistive devices may be placed across the plane of the tongue 410. The magneto-resistive device may include a coil 435 and a carbon rod 440. The carbon rod 440 may be pushed further into the coil 435 as the tongue 410 is deflected, changing the voltage/current output 45 of the magneto-resistive device. The voltage/current output 45 may then be used as a direct indication of the amount of flow in the VCO. As another example, similarly placed Hall effect sensors may achieve the same result.

The palettes 305, 405 of FIGS. 13 and 14 are analogous to the relatively fixed river bed of its natural counterpart. In some embodiments, the palette may not move, as it is a structural feature of the flow meter 300, 400 itself.

An amount of force that is measurable by the flow meter 300, 400 can be determined based upon the shape of the tongue 310, 410. Moving from the centerline of the tongue 310, 410 to its outer area, the thickness of the tongue 310, 410 may increase in proportion to the maximum system flow requirement. Thus, a system with relatively small flow range and differential pressure may have a tongue 310, 410 with a much thinner aggregate cross section than a system with a larger flow range and differential pressure. If the basic requirements for the amount of tongue force required to maintain balance are examined, the force can be roughly evaluated using the following equations.

$$Q = AV \quad \text{(equation 1)}$$

Where:
Q=flow
A=Cross sectional area of the flow conduit
V=Average flow velocity $$V = [(h_v 2g)]^{1/2} \quad \text{(equation 2)}$$

Where:
$h_v$=Velocity head
g=acceleration of gravity $$F = \frac{P}{A} \quad \text{(equation 3)}$$

Where:
F=Force
P=Pressure
Substituting equations 1 and 2 into equation 3 yields $$F = \frac{P([h_v(2g)])^{1/2}}{Q} \quad \text{(equation 4)}$$

The number obtained from equation 4 roughly represents the amount of counter force required in the structural component to balance the fluid pressure applied against the tongue 310, 410. The application of force creates lift or relative upward motion in the tongue 310, 410 that can be measured by any number of conventional devices designed to measure a difference in relative positional proximity.

The palette 305, 405 and tongue 310, 410 may be composed of a variety of different materials, including metals, metal alloys, Teflon, or other engineered plastics. Plastics may be preferable for chemical applications where metal materials would otherwise react with the fluid. For instance, the surfaces of the palette 305, 405 and the tongue 310, 410 that are exposed to the flow may include a formed, cast, or machined metal or metal alloy surface.

One of ordinary skill in the art will recognize that the concepts taught herein can be tailored to a particular application in many other advantageous ways. For example, FIG. 13 shows that the surfaces where the palette 305 and tongue 310 of the flow meter 300 meet have a substantially ridged shape. FIG. 14 shows that the surfaces where the palette 405 and tongue 410 of the flow 400 meet have a substantially flat shape. Such minor modifications to the shape of the palette 305, 405 and the tongue 310, 410 are encompassed within the embodiments of the invention.

Furthermore, many of the specific features shown herein are design choices. For example, the size of the VCO may be increased or decreased in accordance with the magnitude of the flow that is expected. For example, a flow meter in accordance with an embodiment of the invention may measure flows between 0.02 ml/min to 2 L/min, a wide range unobtainable with the conventional flow meter technology that was described above. Other embodiments of the invention have the ability to measure over the same wide range, but smaller or larger magnitude flows can be accommodated by increasing the relative size of the palette and tongue or adjusting the material used for the tongue, making it stronger (stiffer) or weaker (more flexible). Such minor modifications to the size of the VCO are encompassed within the embodiments of the invention.

Furthermore, functionality shown embodied in a single component may be implemented using multiple cooperating components, or vice versa. For example, in one embodiment, a palette remains fixed with respect to a tongue of a flow meter. However, in other embodiments, there may be two tongues that operate in conjunction with each other and a fixed palette may not be present. Such minor modifications are encompassed within the embodiments of the invention It should be appreciated that any of an electric, magneto restrictive, electromagnetic, spectroscopic, photoelectric, photovoltaic, piezoelectric, magnetorheological, radio frequency, acoustic pulse or other technology as a media dependent preferential feedback methodology may be applied to the above embodiments to provide a measured energy source of the sensor. The sensor itself, or a stiffener, may provide positional feedback. A positional deflection, reflection or refraction of an applied energy may be determined by evaluating the temporal and spatial measurements of a fluid flow according to quality and quantity of system energy. This evaluation may result in an inferential measurement of fluid flow. Certain of the embodiments may be used in applications involving color spectroscopy or diffusion spectroscopy.

Some embodiments of the invention provide a mechanical feedback device, or stiffener, that is used in conjunction with the flexible deflection sensor so that it can be tuned for specific flow rates and pipe sizes in such a way so as to cause the flexible deflection sensor to bend in a repeatable and measurable arc. The mechanical positional feedback device may be applied to a flow measurement device to translate the angular deflection that is created by flow pressure against a flexible deflection sensor into a repeatable arc to arrive at an inferential flow measurement. For example, a direct reading of an electrical characteristic of a sensor may provide for an inferential measurement of a fluid property Some embodiments of the invention include a process for affixing a mechanical positional feedback device, or stiffener, onto an existing flexible detection sensor so as to create a resistance to the flow pressure associated with a flow stream into which it is introduced that causes the flexible deflection sensor to bend in an arc that is proportional to the range of flow rates to be measured.

Some embodiments of the invention may include single or multiple stiffening rods, wires, half pipes, cones, rectangles, or flexion devices (or "stiffeners" in general). The stiffeners may have various physical dimensions or may be composed of various materials depending on the flow environment where the flow sensor is to be used. The stiffener or stiffeners are coupled to the flexible deflection sensor in such a way as to limit movement of the flexible deflection sensor to a predetermine arc when flow force is applied to the front area of the flexible deflection sensor.

According to some embodiments, the stiffeners may be manufactured of a thickness and length such that the arc loading response allows a predetermined range of movement that corresponds to the flow pressures present within a flow stream that carries a liquid of a given density, viscosity and specific gravity at a given flow rate. The stiffeners may also be matched to fit flexible deflection sensors in a wide variety of length and width configurations.

According to some embodiments of the invention, a flexible deflection sensor may be coated to prevent adverse interaction between the flexible deflection sensor and the fluid it is immersed in. The process for this coating, when included, protects the sensor in the covering media. This process provides a final coating that does not separate from the flexible deflection sensor over its life cycle. The stiffener is then connected to the coated sensor in order to allow a full range of motion.

The system and apparatus described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or diagrams. This is not necessary, however, and there may be cases where these functional blocks or diagrams are equivalently aggregated into a single logic device, program or operation with unclear boundaries.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A pressure sensing apparatus comprising:
a rigid perimeter;
a flexible membrane forming a surface area bounded by the perimeter; and
a sensing means in communication with the flexible membrane, where the flexible membrane is configured to elastically deform when a pressure force is exerted on the surface area and the sensing means is configured to measure an amount of deformation of the flexible membrane, where the sensing means includes a flexible sensor that is configured to deform in unison with the flexible membrane, where the flexible sensor overlays on the flexible membrane to form a circuit for carrying an electrical signal.

2. The pressure sensing apparatus according to claim 1 where the deformation of the flexible membrane causes a characteristic of the electrical signal to vary according to the amount of deformation, and where the characteristic of the electric signal correlates to a magnitude of the pressure force.

3. A fluid sensing system comprising:
a sensor port;
a sensor including a first end mounted to the sensor port and a second end configured to deflect in a predetermined arc when exposed to a fluid force; and
a stiffening agent located adjacent to the second end of the sensor, the stiffening agent including a counterweight that has a flow-through hole to reduce an amount of fluid turbulence, in which the stiffening agent provides a preconfigured resistance to a deflection of the second end of the sensor, in which an amount of the deflection of the second end of the sensor is measurable to infer a property of the fluid force.

4. The fluid sensing system of claim 3, in which the counterweight is configured to urge the sensor to a vertical orientation in reduced fluid force conditions.

5. A pressure sensing apparatus comprising:
a rigid perimeter;
a flexible membrane forming a surface area bounded by the perimeter, in which the flexible membrane is configured to elastically deform when a pressure force is exerted on the surface area; and
a sensing means in communication with the flexible membrane, the sensing means including a flexible sensor that overlays on the flexible membrane to form a circuit for carrying an electrical signal, in which the sensing means is configured to measure an amount of deformation of the flexible membrane, and in which the flexible sensor is configured to deform in unison with the flexible membrane.

6. A fluid sensing system comprising:
a sensor port;
a sensor including a first end mounted to the sensor port and a second end configured to deflect in a predetermined arc when exposed to a fluid force, in which the sensor is configured to distinguish a fluid flow in a first direction from a fluid flow in a second direction that is opposite the first direction, in which the sensor is further configured to measure a flow rate in both the first and second directions; and
a stiffening agent located adjacent the sensor which provides a preconfigured resistance to a deflection of the second end of the sensor, in which an amount of the deflection of the second end of the sensor is measurable to infer a property of the fluid force, in which the deformation of the flexible membrane causes a characteristic of the electrical signal to vary according to the amount of deformation, and in which the characteristic of the electric signal correlates to a magnitude of the pressure force.

7. A fluid detection device comprising:
a sensor mount;
a flexible deflection sensor configured to deform in a predetermined manner when the fluid detection device is exposed to a fluid, where an amount of the deformation of the flexible deflection sensor determines a property of the fluid, a first end of the flexible deflection sensor connected to the sensor mount, a second end of the flexible deflection sensor configured to move in a predetermined arc when the fluid detection device is exposed to the fluid, the second end of the flexible deflection sensor further configured to direct a flow of the fluid to decrease vortex shedding, in which the second end of the flexible deflection sensor further is further configured to provide an additional positive lifting force when exposed to the flow of the fluid.

8. A fluid detection device comprising:
a sensor mount;
a flexible deflection sensor configured to deform in a predetermined manner when the fluid detection device is exposed to a fluid, where an amount of the deformation of the flexible deflection sensor determines a property of the fluid, a first end of the flexible deflection sensor connected to the sensor mount, a second end of the flexible deflection sensor configured to move in a predetermined arc when the fluid detection device is exposed to the fluid, the second end of the flexible deflection sensor further configured to direct a flow of the fluid to decrease vortex shedding, in which the second end of the flexible detection sensor is further configured to provide in-flight stability when exposed to the flow of the fluid.

9. A fluid sensing system comprising:

a sensor port;

a sensor including a first end mounted to the sensor port and a second end configured to deflect in a predetermined arc when exposed to a fluid force, where an electric signal is propagated through the sensor during operation of the fluid sensing system; and a stiffening agent located adjacent the sensor which provides a preconfigured resistance to a deflection of the second end of the sensor, where a characteristic of the electrical signal that varies with an amount of deflection of the sensor is measured to infer a property of the fluid force the sensor comprising:

a plurality of sensor strips, the sensor strips substantially flattened and disposed on a surface of the stiffening agent, the sensor strips configured to deform or deflect in unison with the stiffening agent;

at least two contacts disposed at one end of the stiffening agent, each of the at least two contacts electrically connected to a corresponding one of the plurality of sensor strips; and a connecting circuit, the connecting circuit and plurality of sensor strips disposed to form a continuous electrical connection between one of the at least two contacts and another one of the at least two contacts.

10. A fluid sensing system comprising:

a sensor port;

a sensor including a first end mounted to the sensor port and a second end configured to deflect in a predetermined arc when exposed to a fluid force, where an electric signal is propagated through the sensor during operation of the fluid sensing system; and a stiffening agent located adjacent the sensor which provides a preconfigured resistance to a deflection of the second end of the sensor, where a characteristic of the electrical signal that varies with an amount of deflection of the sensor is measured to infer a property of the fluid force, including a sail pivotably connected to the sensor port, where the sensor deflects as a result of the fluid force acting on the sail and causing it to pivot in a direction of a fluid flow, an end of the sail configured to reduce vortex shedding, to provide an additional positive lifting force, and to provide in-flight stability.

* * * * *